United States Patent
Toeroe

(10) Patent No.: US 9,081,598 B2
(45) Date of Patent: Jul. 14, 2015

(54) ENSURING HARDWARE REDUNDANCY IN A VIRTUALIZED ENVIRONMENT

(71) Applicant: TELEFONAKTIEBOLAGET L M ERICSSON (PUBL), Stockholm (SE)

(72) Inventor: Maria Toeroe, Montreal (CA)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 170 days.

(21) Appl. No.: 13/690,373

(22) Filed: Nov. 30, 2012

(65) Prior Publication Data

US 2014/0157261 A1   Jun. 5, 2014

(51) Int. Cl.
| | |
|---|---|
| G06F 9/455 | (2006.01) |
| G06F 15/173 | (2006.01) |
| G06F 11/14 | (2006.01) |
| G06F 11/20 | (2006.01) |

(52) U.S. Cl.
CPC ........ *G06F 9/45533* (2013.01); *G06F 11/1482* (2013.01); *G06F 11/2023* (2013.01); *G06F 2201/815* (2013.01)

(58) Field of Classification Search
None
See application file for complete search history.

(56) References Cited

U.S. PATENT DOCUMENTS

| | | | |
|---|---|---|---|
| 8,006,130 B2 | 8/2011 | Kanso et al. | |
| 8,201,180 B2 | 6/2012 | Briscoe et al. | |
| 2007/0233698 A1* | 10/2007 | Sundar et al. | 707/10 |
| 2007/0240171 A1* | 10/2007 | Biro et al. | 719/328 |
| 2009/0044186 A1* | 2/2009 | Biro | 718/1 |
| 2009/0070771 A1* | 3/2009 | Yuyitung et al. | 718/105 |
| 2009/0138752 A1 | 5/2009 | Graham et al. | |
| 2009/0164767 A1* | 6/2009 | Kanso et al. | 713/1 |
| 2009/0164832 A1* | 6/2009 | Kanso et al. | 714/1 |
| 2011/0035738 A1* | 2/2011 | Toeroe et al. | 717/168 |
| 2011/0196984 A1* | 8/2011 | Joukov | 709/240 |
| 2011/0197198 A1 | 8/2011 | Kanso et al. | |
| 2011/0231696 A1* | 9/2011 | Ji et al. | 714/3 |
| 2011/0270595 A1* | 11/2011 | Salehi et al. | 703/6 |
| 2012/0042311 A1 | 2/2012 | Biran et al. | |
| 2012/0159476 A1* | 6/2012 | Ramteke et al. | 718/1 |
| 2012/0229466 A1* | 9/2012 | Riche et al. | 345/440 |

(Continued)

OTHER PUBLICATIONS

Wolski, et al. "A Self-Managing High-Availability Database: Industrial Case Study". Proceedings of the 21$^{st}$ International Conference on Data Engineering IEEE 2005.*

(Continued)

*Primary Examiner* — Adam Lee
(74) *Attorney, Agent, or Firm* — Nicholson De Vos Webster & Elliott, LLP

(57) ABSTRACT

An Availability Management Framework (AMF) configuration is generated, in which service units of a service group are allocated to node groups and the node groups are allocated to physical nodes. Each service unit is a unit of redundancy for services provided and protected by the service group. Each node group includes a group of virtual machines. Each node group is mapped to a different host group that includes one or more physical nodes. Collocation and separation rules are generated for the virtual machines to specify which virtual machines are collocated in a same node group and which virtual machines are separated by different node groups. Each service unit of the service group is mapped to a different node group to guarantee hardware separation in the AMF configuration for different service units of the service group and for the virtual machines allocated to the different service units.

24 Claims, 8 Drawing Sheets

(56) References Cited

U.S. PATENT DOCUMENTS

| | | | |
|---|---|---|---|
| 2012/0240129 A1 | 9/2012 | Kanso et al. | |
| 2012/0266166 A1* | 10/2012 | Farkas et al. | 718/1 |
| 2012/0324071 A1* | 12/2012 | Gulati et al. | 709/223 |
| 2013/0055262 A1* | 2/2013 | Lubsey et al. | 718/1 |
| 2013/0097319 A1* | 4/2013 | Ahmad et al. | 709/226 |
| 2013/0097464 A1* | 4/2013 | Ahmad et al. | 714/47.1 |
| 2013/0304899 A1* | 11/2013 | Winkler | 709/224 |
| 2014/0059228 A1* | 2/2014 | Parikh | 709/226 |

OTHER PUBLICATIONS

Kanso et al. "Ranking Service Units for Providing and Protecting Highly Available Services with Load Balancing". IEEE 2010.*
Salehi, et al. "SSIRI 2009 Short Paper Checking Service Instance Protection for AMF Configurations" IEEE International Conference on Secure Software Integration and Reliability Improvement 2009.*
EP Search Report; EP Application No. 13-00-5500; Mar. 7, 2014; 6 pages.

* cited by examiner

AN EXAMPLE AMF CONFIGURATION

US 9,081,598 B2

ENSURING HARDWARE REDUNDANCY IN A VIRTUALIZED ENVIRONMENT

TECHNICAL FIELD

Embodiments of the invention relate to the Availability Management Framework (AMF).

BACKGROUND

Highly available systems are fault tolerant systems with no single point of failure. Highly available services are typically provided by large and complex systems built from Commercial-Of-The-Shelf (COTS) components. Such systems are deployed on top of standardized middleware services that manage service availability by monitoring component health and by shifting workload from a faulty component to a healthy one.

The Service Availability Forum (SA Forum) is a consortium of industry-leading companies promoting a set of open specifications that enables the creation and deployment of highly available, mission critical services. As a standardization body, the SA Forum has defined a set of open specifications for middleware services including the Availability Management Framework (AMF) for supporting and managing service availability (see, *SA Forum, Application Interface Specification, Availability Management Framework SAI-AIS-AMF-B*.04.01). Specifically, the AMF specification describes a middleware service, which is responsible for maintaining and managing the high availability of the services provided by applications. The AMF specification aims at reducing the application development time and cost by shifting the availability management from applications to this middleware service. This middleware service (referred to hereinafter as the AMF) manages the redundancy of the components of an application and dynamically assigns the workload to each component.

Cloud computing introduces a paradigm of paying for services rather than paying for the physical infrastructure. Services offered to users may abstract infrastructure, platform or application entities; typically through the virtualization of these entities. Therefore, the users are not aware of and do not need to be aware of the underlying infrastructure and its organization. As a result, the services can be scaled up and down on demand, and users only need to pay for their actual use of the resources.

The abstraction offered by cloud computing is convenient for flexibility but is an obstacle when it comes to ensure high availability. As described above, the AMF specification defines redundancy models and uses redundancy to ensure high availability. When a cloud computing system is hosted on a virtualized infrastructure, the allocation of virtual machines to physical hosts is not visible to AMF. Therefore, there is no assurance of physical separation among the redundant service units and hardware redundancy required by an AMF configuration cannot be guaranteed. In addition, virtual machine migration that takes place at the virtualization level can also complicate redundancy based availability management.

BRIEF DESCRIPTION OF THE DRAWINGS

The present invention is illustrated by way of example, and not by way of limitation, in the figures of the accompanying drawings in which like references indicate similar elements. References in the disclosure to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

SUMMARY

Figure 1:
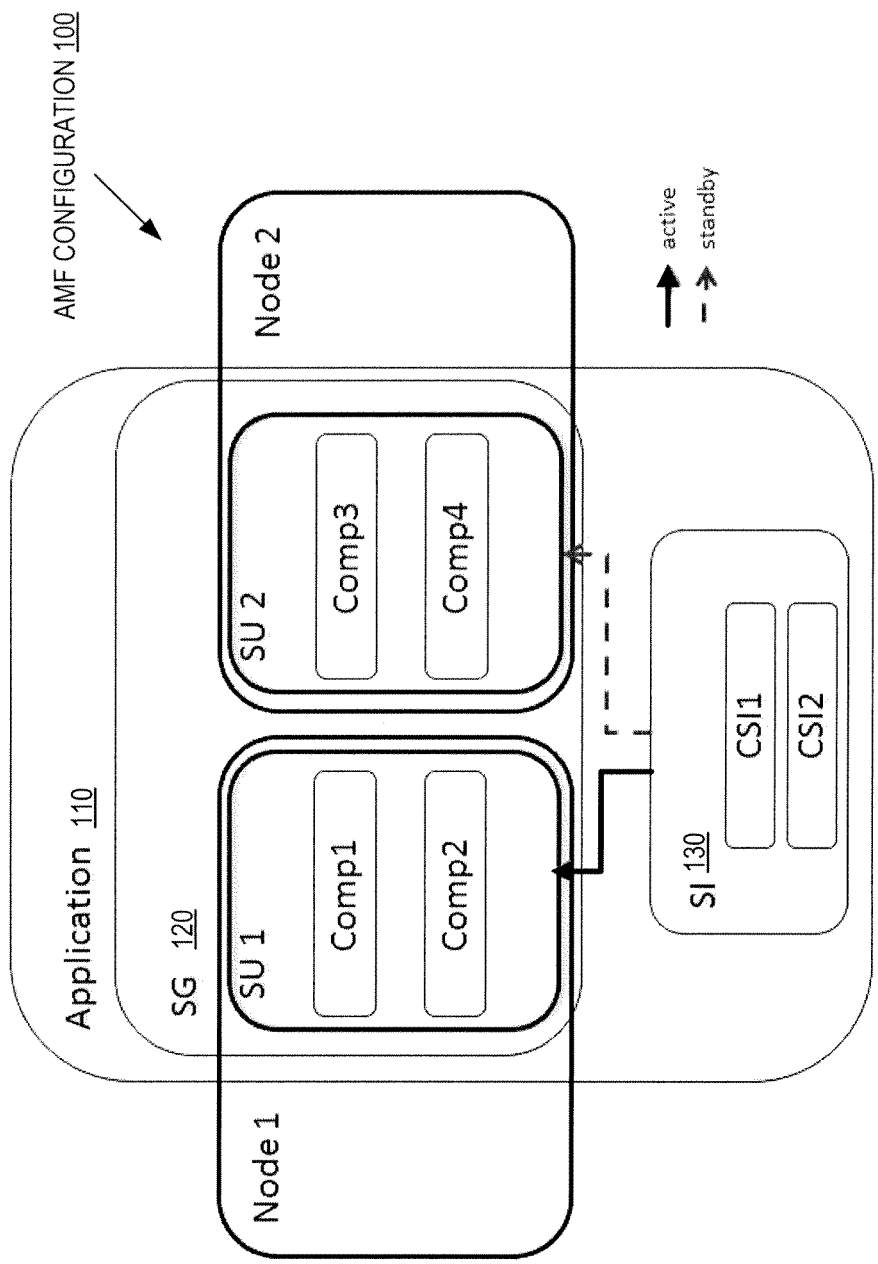
FIG. 1 illustrates an example of an AMF configuration that provides redundancy.

Embodiments of the invention provide an AMF configuration, in which service units of a service group are allocated to node groups and the node groups are allocated to physical nodes such that hardware redundancy for the service group is guaranteed. Each service unit is a unit of redundancy for services provided and protected by the service group. Each service unit includes one or more hardware and/or software components.

In one embodiment, a method of generating an AMF configuration is described. The method generates a node group set (NG set) of node groups, where each node group in the NG set includes a group of virtual machines and is to be mapped to a different host group that includes one or more physical nodes. Collocation and separation rules are generated for the virtual machines to specify which virtual machines are collocated in a same node group and which virtual machines are separated by different node groups. The method further maps each service unit of the service group to a different node group to guarantee hardware separation in the AMF configuration for different service units of the service group and for the virtual machines allocated to the different service units.

In another embodiment, a computer system that comprises one or more processors and one or more memory devices is described. The computer system further includes a configuration generation module, which is adapted to perform the method of generating an AMF configuration as described above.

In yet another embodiment, a method of deploying an AMF configuration is described. The method forms a node group set (NG set) of node groups according to the AMF configuration, where each node group in the NG set includes a group of virtual machines and is to be mapped to a different host group that includes one or more physical nodes. Collocation and separation rules are applied to the virtual machines to specify which virtual machines are collocated in a same node group and which virtual machines are separated by different node groups. The method further maps each service unit of the service group to a different node group according to the AMF configuration, to thereby guarantee hardware separation in the AMF configuration for different service units of the service group and for the virtual machines allocated to the different service units.

In another embodiment, a computer system that comprises one or more processors and one or more memory devices is described. The computer system further includes a configuration deployment module, which is adapted to perform the method of deploying an AMF configuration as described above.

DESCRIPTION OF EMBODIMENTS

In the following description, numerous specific details are set forth. However, it is understood that embodiments of the invention may be practiced without these specific details. In other instances, well-known circuits, structures and techniques have not been shown in detail in order not to obscure the understanding of this description. It will be appreciated, however, by one skilled in the art, that the invention may be practiced without such specific details. Those of ordinary skill in the art, with the included descriptions, will be able to implement appropriate functionality without undue experimentation.

An AMF configuration mechanism is described herein. The configuration mechanism generates an AMF configuration, in which service units of a service group are allocated to node groups and the node groups are allocated to physical nodes such that hardware redundancy for the service group is guaranteed. The configuration mechanism may be used in a virtualization environment, where operations of the service units are performed by virtual machines. To ensure hardware separation among redundant service units in the presence of virtual machine migration, a set of collocation and separation rules is defined to specify which virtual machines may and which may not be collocated on the same physical node. The resulting AMF configuration can be deployed on a system provider's system; for example, a cloud computing provider's system.

Before describing the AMF configuration mechanism in detail, it is helpful to explain some basic concepts of AMF configurations. The basic building block of a configuration model is the component, which abstracts a set of software/hardware resources. Components can be deployed on nodes. The nodes provide an execution environment for the components and include virtual machines or operating system instances. The service provided by a component is represented by a component service instance. Components that closely collaborate and that must be collocated to provide an integrated service are grouped into a service unit. The set of services provided by these closely-collaborating components is represented by a service instance. A service unit is a unit of redundancy for services provided and protected by a service group, and each service unit includes one or more hardware and/or software components. A set of collaborating redundant service units form amen/ice group. It is in the context of a service group that service availability management takes place. In other terms, the services are provided by service units and protected against failures within a service group. An application is a set of service groups. These different configuration entities identify different increasing fault zones, which are the scopes that can be isolated and repaired to isolate a fault. It is the responsibility of the system integrator to dimension the scope of those service units and service groups, and to define the recovery policies associated with them so that they are appropriate for the targeted level of service availability.

FIG. 1 illustrates an example an AMF configuration 100 of a system that runs an application 110. The AMF configuration 100 includes a service group (SG 120) formed by two service units (SU1, SU2), each having respectively two components. Each set of two components runs on a different node (node1, node2). The SG 120 provides one service-instance (SI 130) with two component service instances (CSI1, CSI2) at runtime. The SI 130 is assigned to an active service unit (SU1) and a standby service unit (SU2) according to the AMF configuration 100.

In an AMF configuration, such as the example shown in FIG. 1, service units are the redundant entities that provide and protect services. Those service units that may protect the same service instances are aggregated into a service group. Accordingly, AMF assigns a service instance to different service units in the service group in different roles; e.g., active and standby, so that if the active service unit fails, the standby service unit can take over the service provisioning.

To protect such a service instance from a physical node failure, the service units having the active and standby assignments must be running on different physical nodes. The allocation of service units to physical nodes is indirect. In a virtualized environment, service units are allocated to physical nodes through multiple layers, one of which is a virtualization layer where virtual machines are managed.

In a conventional AMF configuration, a service unit may be configured to run on a particular AMF node (e.g., node1 and node2 of FIG. 1), or on any node of a node group defined in the configuration for the service unit or its service group. Alternatively, if no node group is defined at any level, the service unit may be instantiated anywhere in a cluster of nodes. An AMF node maps to a physical node through multiple layers. An AMF node is mapped into exactly one cluster node managed by the Cluster Membership Service (CLM). Each CLM node is mapped into exactly one operating system instance, which may run directly on a physical node or may run in a virtual machine. In the latter case there may be multiple CLM nodes and therefore multiple AMF nodes running on the same physical node. The collocation of the virtual machines is not visible to the availability management layer (also referred to as the "AMF layer"), in which the service group and service units operate. Therefore, virtualization jeopardizes the redundancy based availability management. As a result, hardware separation is not guaranteed by a conventional AMF configuration in a virtualized environment.

The SA Forum introduced the Platform Management Service (PLM) to represent virtualization in the system information model. However, the PLM specification does not distinguish the virtualization facilities from the operating system instances. Therefore, the PLM specification does not deal with issues introduced by virtualization such as live migration. Even in the static scenario where live migration does not occur, the PLM specification provides no guidance on how AMF is expected to use the PLM information. As a result, AMF is generally not aware of the mapping of AMF nodes to physical nodes. On the other hand, the virtualization layer is not aware of the AMF layer and therefore cannot provide a solution for AMF with respect to the redundancy based availability management.

The configuration mechanism described herein connects the virtualization layer with the AMF layer so that these layers complement each other. The configuration mechanism operates within the framework of existing AMF concepts so that there is no change to the existing implementations of the AMF layer. The configuration mechanism ensures hardware redundancy at the AMF layer without requiring the AMF layer to know about the distribution of virtual machines on the physical nodes. Similarly, the virtualization layer does not need to know about the service assignments at the AMF layer. The configuration mechanism also supports virtual machine migration at the virtualization layer to provide elasticity in service deployment.

The configuration mechanism provides a set of collocation and separation rules that specify which virtual machines may and which may not be collocated on the same physical node. At the AMF layer, node groups are formed from the virtual machines that can be collocated. Each node group is mapped to a single physical node for the purpose of the AMF configuration. Further, different service units of a service group are mapped to different node groups. This guarantees that the node groups to which the different service units are allocated are disjoint with respect to the underlying physical hardware, and therefore AMF cannot assign the active and standby roles to two service units located on the same physical node. As a result, hardware redundancy is provided.

Figure 2:
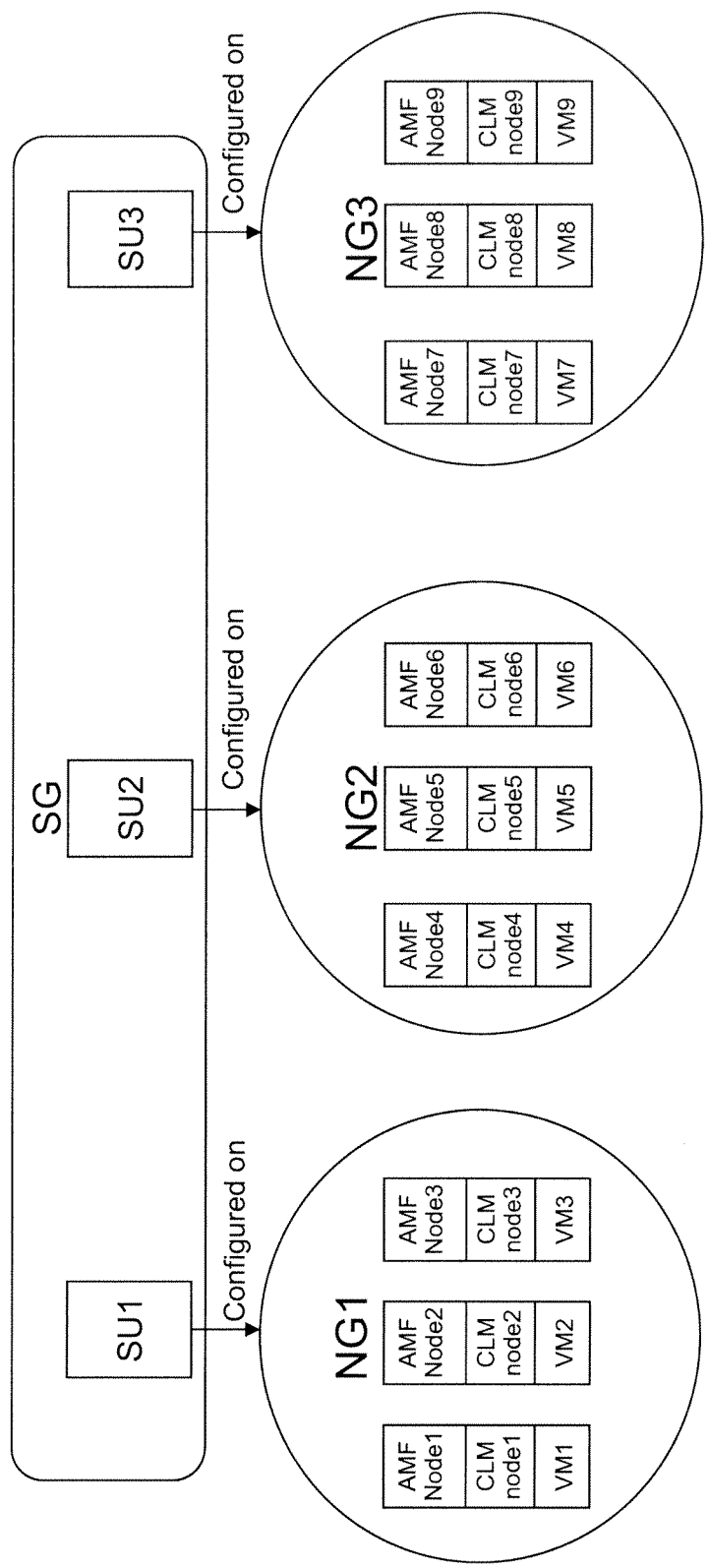
FIG. 2 illustrates an example of distributing virtual machines into disjoint sets according one embodiment.

FIG. 2 illustrates an example of distributing virtual machines into disjoint sets according one embodiment. To ensure hardware redundancy for service assignments at the AMF layer, disjoint sets of virtual machines are defined at the virtualization layer. Each of these virtual machines can host a CLM node, which in turn can host an AMF node. One or more AMF nodes form a node group. In FIG. 2 three sets of virtual machines {VM1, VM2, VM3}, {VM4, VM5, VM6}, and {VM7, VM8, VM9} are defined. At the AMF level the three sets of virtual machines form three node groups (NGs): NG1 with AMF nodes Node1, Node2 and Node3; NG2 with AMF nodes Node4, Node5 and Node6; and NG3 with AMF nodes Node7, Node8 and Node9.

In the AMF configuration, service units are configured for such node groups. For example, SU1 is configured on NG1, SU2 on NG2 and SU3 on NG 3. From AMF's perspective, NG1, NG2 and NG3 are special node groups as each one of them does not guarantee hardware redundancy. Thus, each node group (NG1, NG2, NG3) is used only to configure a service unit, but not a service group. The node group of service group SG is formed by the union of these node groups: (NG1) U (NG2) U (NG3); that is, {Node1, Node2, Node3, Node4, Node5, Node6, Node7, Node8, Node9}.

To ensure that the hardware redundancy is guaranteed at the virtualization layer, a set of collocation and separation rules is defined for the virtualization to follow. The rules specify that virtual machines of each node group can be collocated with their peers within the node group. The rules further specify that virtual machines of different node groups must not be collocated and need to be separated by the virtualization layer.

Accordingly, the minimum number of physical nodes needed for supporting the hardware separation is equal to the number of node groups defined for the AMF configuration. Thus, each physical node hosts all the virtual machines of the node group associated with the physical node. If additional physical nodes are available, each physical node may host a subset of the virtual machines in the associated node group. In one scenario, each physical node may host only one virtual machine of the associated node group to provide maximum processing capacity to each virtual machine. Regardless of how many physical nodes are in a host group, the physical nodes logically form as many disjoint host groups as the number of node groups, as shown in FIG. 3.

Figure 3:
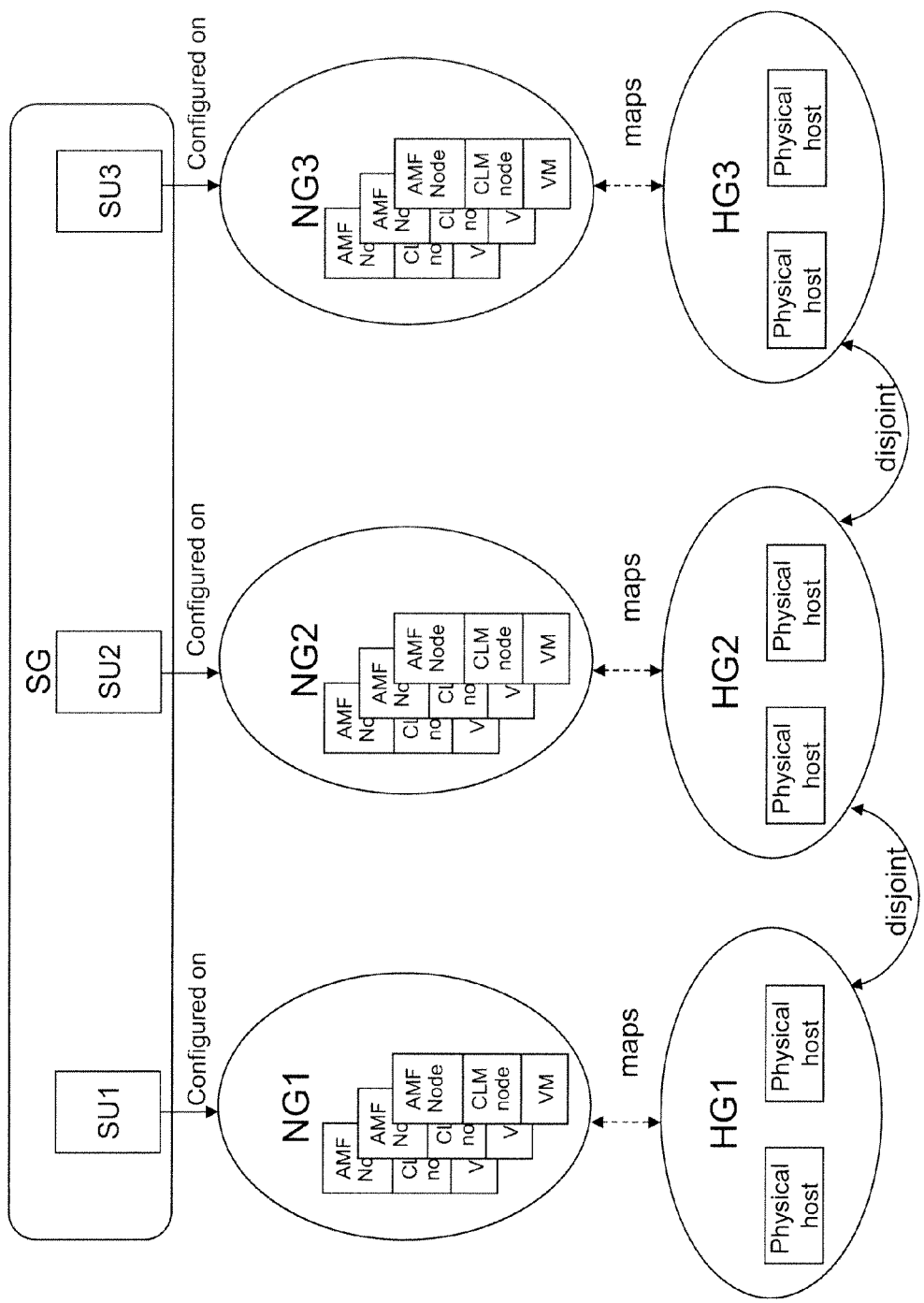
FIG. 3 illustrates an example of a mapping between node groups and host groups according to one embodiment.

FIG. 3 illustrates an example of the mapping between node groups and host groups according to one embodiment. Each host group (HG1, HG2, HG3) includes one or more physical nodes. None of the host groups have overlapping physical nodes. There is a one-to-one mapping between a node group and a host group. In this example, node groups NG1, NG2, and NG3 are mapped to host groups HG1, HG2 and HG3, respectively. The host groups are disjoint; that is, a host group only host virtual machines in one node group, and does not host virtual machines in other node groups. Thus, virtual machines of a node group can migrate between the physical nodes of their host group without jeopardizing the hardware redundancy.

Figure 4C:
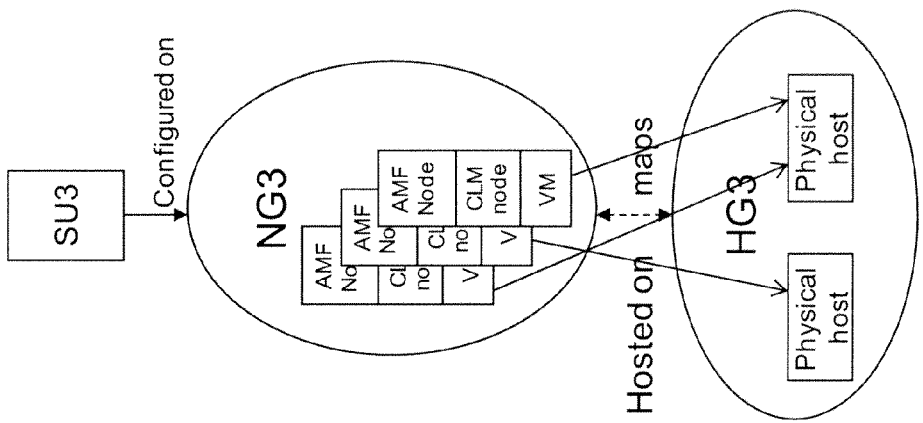
FIGS. 4A-4C illustrate three example scenarios of hosting virtual machines of a node group on physical nodes of a host group according one embodiment.
Figure 4B:
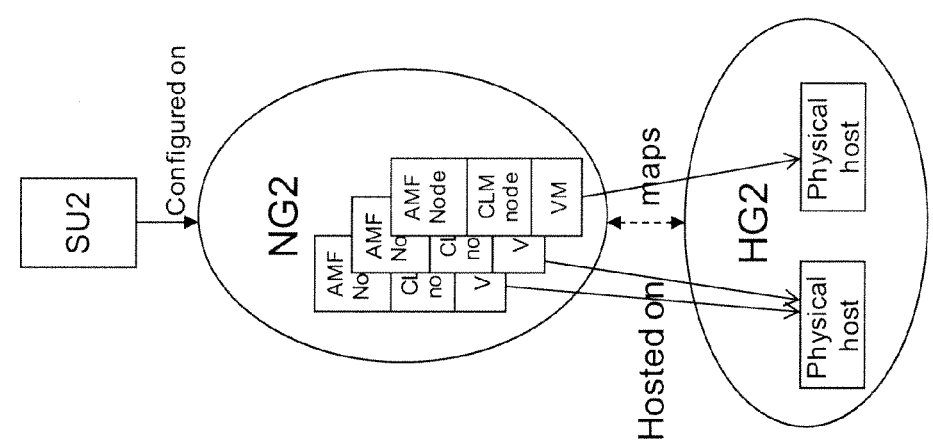
Figure 4A:
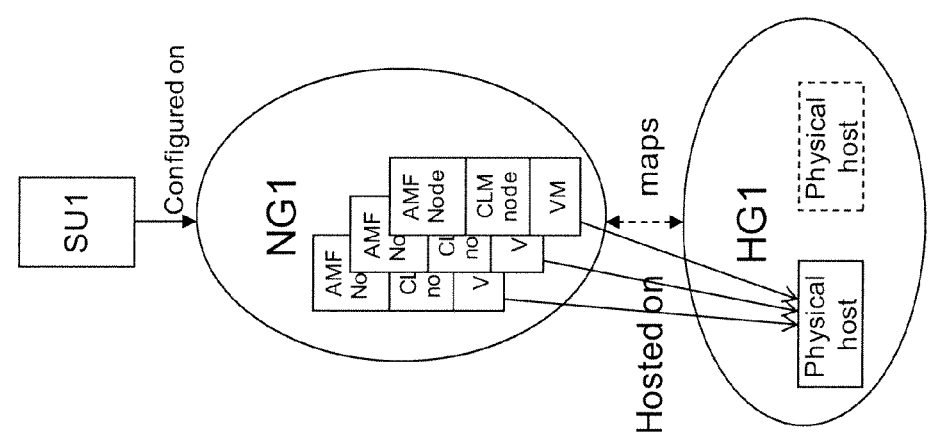

FIGS. 4A-4C illustrate three example scenarios of hosting the virtual machines of a node group (NG') on the physical nodes of a host group (HG1). In these examples, node group NGl has three virtual machines and host group HG1 has two physical nodes. In FIG. 4A, all of the three virtual machines are hosted on one physical node of host group FIG. 1. In FIG. 4B, two of the virtual machines are hosted on a first physical node and one virtual machine is hosted on a second physical node. In FIG. 4C, one virtual machine is hosted on the first physical node and two virtual machines are hosted on the second physical node. As can be seen from the examples of FIGS. 4A-4C, the mapping of virtual machines to physical nodes as described herein allows the system to be scaled up and down in an elastic manner for cloud computing.

Figure 5:
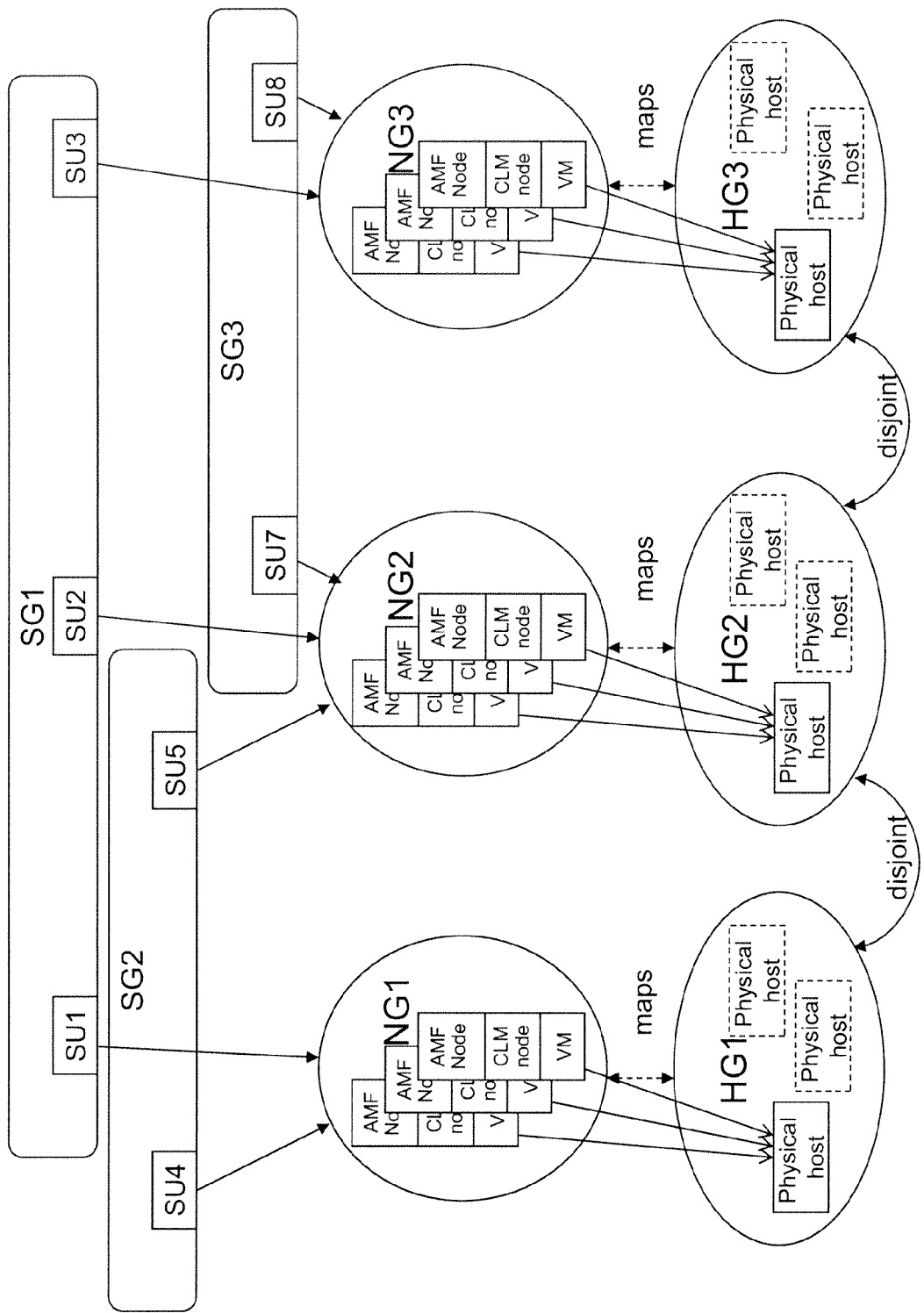
FIG. 5 illustrates an example of configuring service units from multiple service groups according one embodiment.

For efficient usage of the resource, service units from different service groups can be mapped to the same node group, while service units of the same service group are mapped to different node groups. FIG. 5 illustrates an example of configuring the service units from multiple service groups according one embodiment. In this example, all virtual machines of each node group are hosted by one physical node of each host group. The other physical nodes are turned off or otherwise de-activated.

Figure 6:
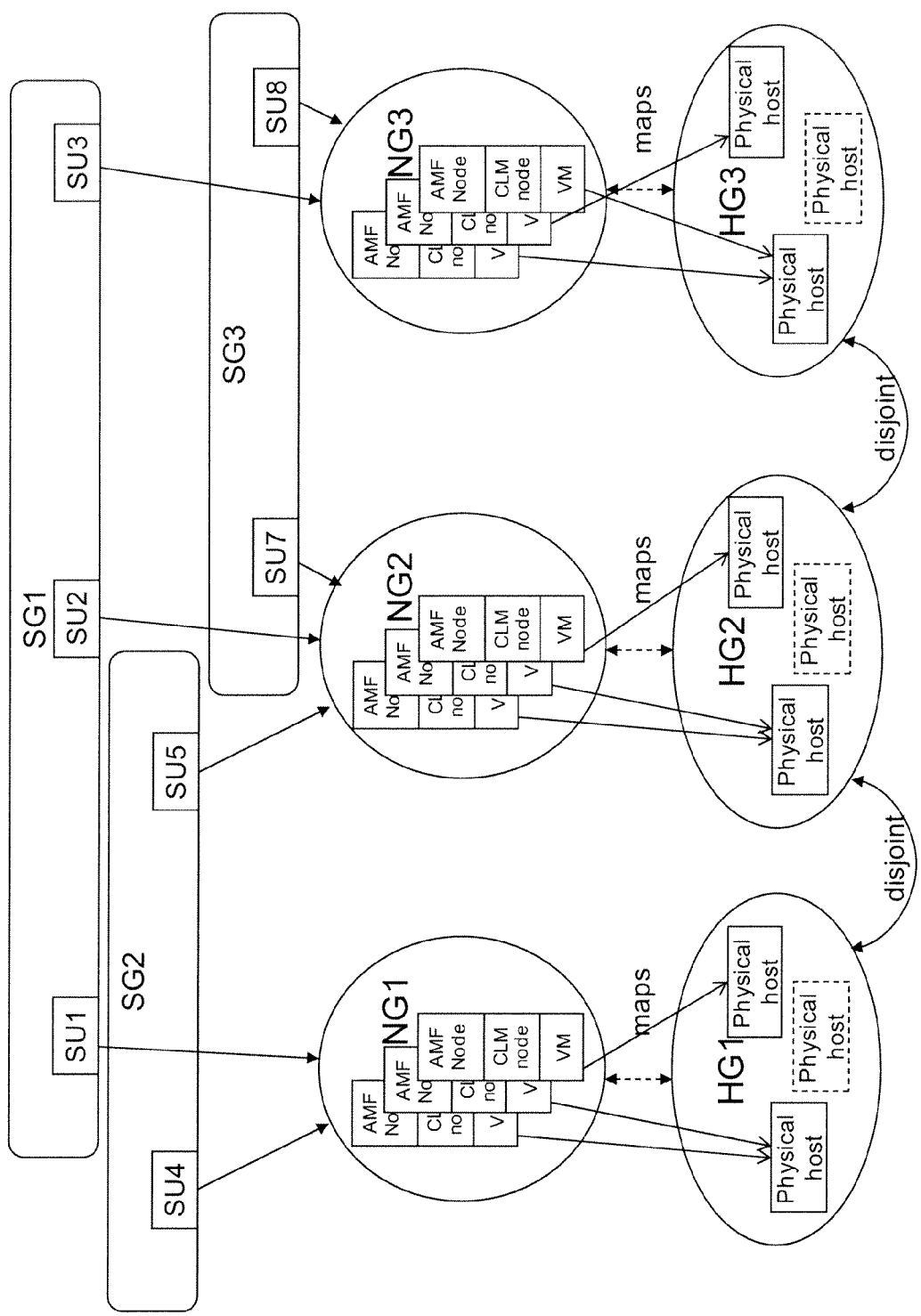
FIG. 6 illustrates an example scenario when more than one physical node in each host group is turned on according one embodiment.

FIG. 6 illustrates an example scenario when some of these other physical nodes are turned on according one embodiment. The physical nodes may be turned on when the virtual machines need more capacity. For example, the virtual machines of node group NG1 (which is mapped to host group HG1) can migrate from a first physical node in HG1 to a second physical node in HG1 when the second physical node becomes available. Similar migration can take place in NG2 and NG3 in FIG. 6.

In order to maintain availability, virtual machines of different node groups cannot be migrated simultaneously. However, virtual machines of the same node group can be migrated at the same time. In the example of FIG. 6, a virtual machine VM1 in NG1 and another virtual machine VM2 in NG2 may be hosting two service units (e.g., SU1 and SU2) from the same service group (SG1). SU1 and SU2 may be assigned the active role and the standby role, respectively, for the same service. If, simultaneously, VM1 is migrated within NG1 from one physical node to another and VM2 is also migrated within NG2 from one physical node to another, both SU1 and SU2 move with them and the active and the standby assignments of the service instance are impacted simultaneously; i.e., no further recovery of the service is possible. As another example, if VM1 and VM3 are in the same node group NG1, they will not host service units from the same service group (because of the collocation and separation rules), and therefore cannot have assignments for the same service instance. Thus, both VM1 and VM3 can be migrated simultaneously from one physical node to another within NG1, as the migration does not impact all of the redundant assignments of a service at the same time. The AMF configuration described herein may define a set of migration rules that prohibit virtual machines of different node groups to be migrated simultaneously and allow virtual machines of the same node group to be migrated simultaneously.

Referring to the examples of FIG. 5 and FIG. 6, in one scenario, service units of different service groups may be allocated to the same node group, and AMF resolves the allocation of service units to virtual machines at runtime. Alternatively, service units may be directly allocated to different nodes of a node group. This alternative allocation scenario is necessary if an application requires collocation of service units of different service groups. If the same node group is reused at the service group level, there is no guarantee that these service units of different service groups will have hardware separation.

The configuration mechanism described herein ensures hardware redundancy for AMF configurations. Such an AMF configuration can apply to multiple service groups having the same or different sizes, where the size of a service group is defined as the number of service units in that service group. The maximum size of these service groups is equal to the number of node groups, which is also equal to the minimum number of physical nodes that operate in a service provider's system. The number of host groups is at least the same as the number of node groups. The number of physical nodes in each host group can range from one to any positive integer number; however, only an $N_{vm}$ number of physical nodes in a host group can be utilized at the same time, where $N_{vm}$ is the number of virtual machines in the associated node group. In the example of FIG. 6, $N_{vm}$ is 3 for each of the node groups. In some scenarios, physical nodes can be moved from one host group to another host group, as long as the hosted virtual machines do not violate the collocation and separation rules.

Figure 7A:
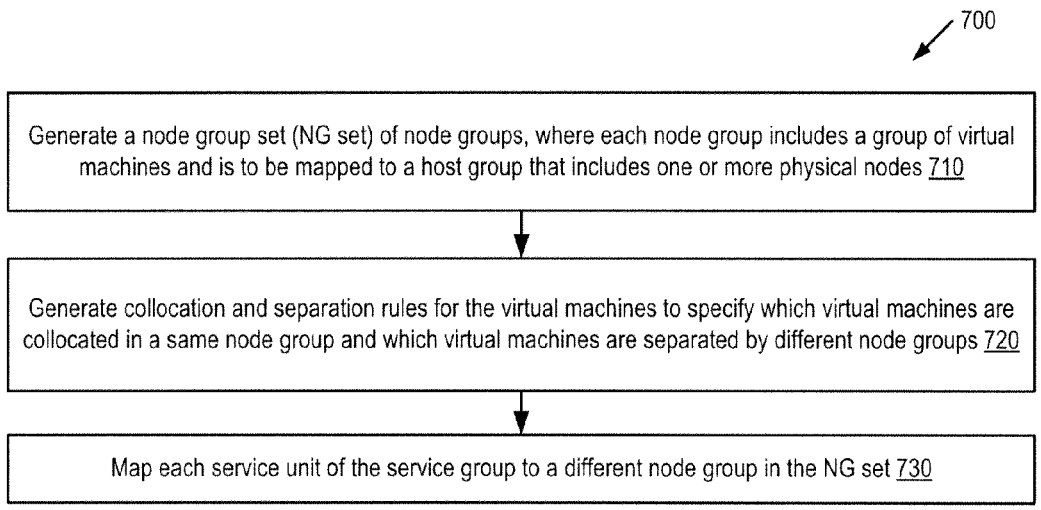
FIG. 7A is a flow diagram illustrating a method for generating an AMF configuration according to one embodiment of the invention.

FIG. 7A illustrates one embodiment of a method 700 for generating an AMF configuration for a service provider system. The method 700 may be performed by a computer system, such as a computer system 800 that executes a configuration module to be described below with reference to FIG. 8. One or more parts of an embodiment of the invention may be implemented using different combinations of software, firmware, and/or hardware.

In the embodiment of FIG. 7A, the configuration module is a configuration generation module that generates an AMF configuration for a service provider system. An example of a service provider system is a cloud computing system, although other service providing entities may also be contemplated. The configuration module generates a node group set (NG set) of node groups, where each node group in the NG set includes a group of virtual machines, and each node group is to be mapped to a host group including one or more physical nodes (710). The configuration module also generates collocation and separation rules for the virtual machines to specify which virtual machines are collocated in the same node group and which virtual machines are separated by different node groups (720). The configuration module maps each service unit of the service group to a different node group in the NG set to produce the AMF configuration (730). The AMF configuration generated by the method 700 guarantees hardware separation for different service units of the service group and for the virtual machines allocated to the different service units.

Figure 7B:
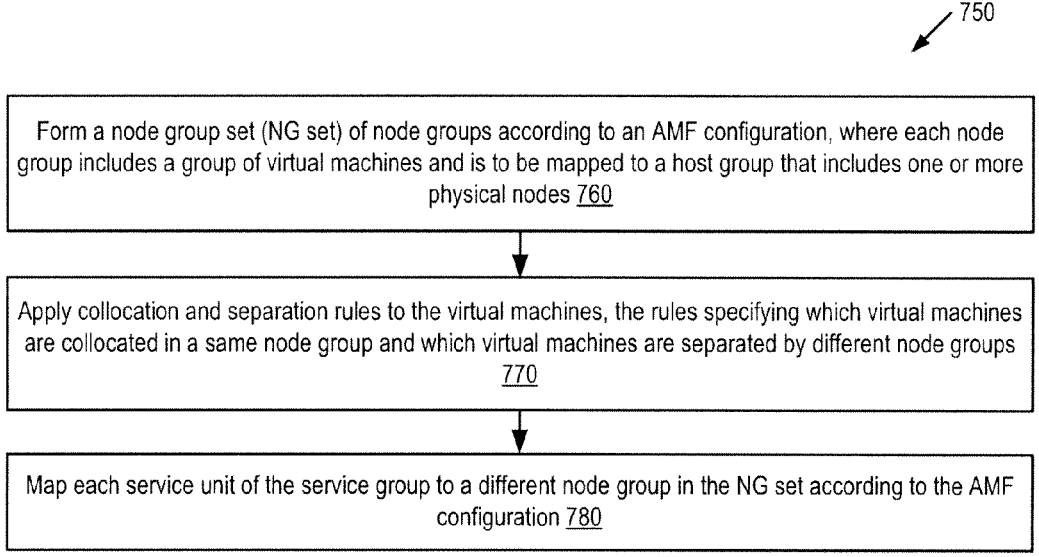
FIG. 7B is a flow diagram illustrating a method for deploying an AMF configuration according to one embodiment of the invention.

FIG. 7B illustrates one embodiment of a method 750 for deploying an AMF configuration to a service provider system. The method 750 may be performed by a computer system, such as a computer system 800 that executes a configuration module to be described below with reference to FIG. 8. One or more parts of an embodiment of the invention may be implemented using different combinations of software, firmware, and/or hardware.

In the embodiment of FIG. 7B, the configuration module is a configuration deployment module that deploys an AMF configuration to a service provider system. The configuration module forms a node group set (NG set) of node groups according to the AMF configuration, where each node group in the NG set includes a group of virtual machines and each node group is to be mapped to a host group including one or more physical nodes (760). The configuration module also applies collocation and separation rules to the virtual machines, wherein the rules specify which virtual machines are collocated in the same node group and which virtual machines are separated by different node groups (770). The configuration module maps each service unit of the service group to a different node group in the NG set according to the AMF configuration (780). The AMF configuration deployed by the method 750 guarantees hardware separation for different service units of the service group and for the virtual machines allocated to the different service units.

In one embodiment, the mapping between the node groups and the host groups is achieved by mapping the virtual machines to physical nodes according to the collocation and separation rules. The mapping between the virtual machines to physical nodes may be performed by a virtualization layer; e.g., a cloud computing management system.

In some embodiments, the sizes of the node groups, host groups, NG set, and HG set can be determined as follows. when an AMF configuration is generated. First, the minimum number (Nmin) of physical nodes and the maximum number (Nmax) of physical nodes that are available to operate in the service provider system are identified. The value Nmax may be determined by hardware availability, power constraints, or other constraints. The value Nmax may alternatively be determined by the maximum number of virtual machines that are expected to run in the system. The value Nmin may be determined by the service requirements (e.g., the minimum amount of processing power required by the service consumers), redundancy requirement, and/or other requirements. In the context of availability management, the redundancy requirement is the requirement that must not be violated when establishing the lower bound of physical nodes. In one embodiment, the value Nmin may be the determined by the number of service units in the largest service group in the AMF configuration. For example, the size of each service group may be calculated from the services that it provides with the required protection (i.e., redundancy model, number of active/standby assignments, number of spare service units, etc.).

Thereafter, a node group set ("NG set") is defined or generated to include Nmin node groups, and a virtual machine set ("VM set") is also defined to include Nmax virtual machines. The configuration module distributes the virtual machines in the VM set equally among the node groups of the NG set. Correspondingly, the Nmax physical nodes are grouped into Nmin host groups. As explained above with reference to FIG. 6, the number of physical nodes in each host group can range from one to any positive integer number. To optimize the processing capacity of the virtual machines, each host group may be assigned the same number of physical nodes as the number of virtual machine in the associated node group. The Nmin host groups form a host group set ("HG set").

Based on the distribution of the virtual machines in the node groups, the configuration module defines or generates the collocation and separation rules, as well as the migration rules, for the virtual machines. The collocation and separation rules specify which virtual machines may and which may not be collocated on the same physical node. The migration rules prohibit virtual machines of different node groups to be migrated simultaneously and allow virtual machines of the same node group to be migrated simultaneously. The virtualization layer does not need to be made aware of the host groups.

The configuration module configures service units of a service group to different node groups in the NG set. Accordingly, the largest service group can have up to Nmin service units with the guarantee of hardware redundancy. The configuration module may configure multiple service groups to the NG set, with each service group having at most Nmin service units. Service units of different service groups can be configured to the same node group or can be allocated directly to the nodes of the same node group.

Figure 8:
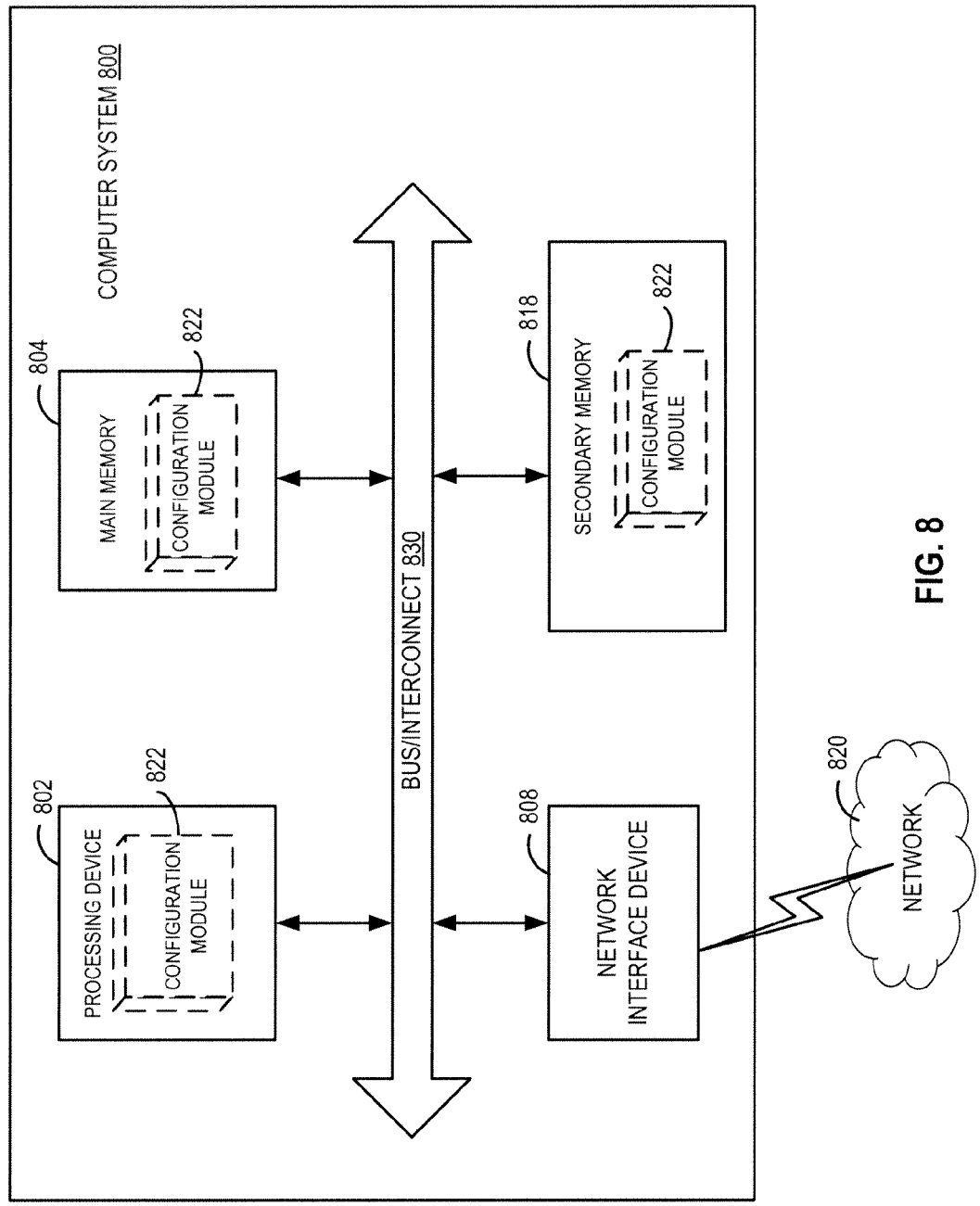
FIG. 8 illustrates a diagrammatic representation of a computer system according to one embodiment.

FIG. 8 illustrates a diagrammatic representation of a machine in the exemplary form of a computer system 800 within which a set of instructions, for causing the machine to perform any one or more of the methodologies discussed herein, may be executed. The computer system 800 may be a server computer, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The computer system 800 includes a processing device 802. The processing device 802 represents one or more general-purpose processors, each of which can be: a microprocessor, a central processing unit (CPU), a multicore system, or the like. More particularly, the processing device 802 may be a complex instruction set computing (CISC) microprocessor, reduced instruction set computing (RISC) microprocessor, very long instruction word (VLIW) microprocessor, processor implementing other instruction sets, or processors implementing a combination of instruction sets. The processing device 802 may also be one or more special-purpose processing devices such as an application specific integrated circuit (ASIC), a field programmable gate array (FPGA), a digital signal processor (DSP), network processor, or the like. In one embodiment, the processing device 802 is adapted to execute the operations of a configuration module 822, which may be a configuration generation module as described above in connection with FIG. 6A, and/or a configuration deployment module, as described above in connection with FIG. 6B.

In one embodiment, the processor device 802 is coupled to one or more memory devices such as: a main memory 804 (e.g., read-only memory (ROM), flash memory, dynamic random access memory (DRAM) such as synchronous DRAM (SDRAM) or Rambus DRAM (RDRAM), etc.), a secondary memory 818 (e.g., a magnetic data storage device, an optical magnetic data storage device, etc.), and other forms of computer-readable media, which communicate with each other via a bus or interconnect 830. The memory devices may also different forms of read-only memories (ROMs), different forms of random access memories (RAMs), static random access memory (SRAM), or any type of media suitable for storing electronic instructions. In one embodiment, the memory devices nay store the code and data of the configuration module 822, which is described above in connection with FIG. 6A and/or FIG. 6B. In the embodiment of FIG. 8, the configuration module 822 may be located in one or more of the locations shown as dotted boxes and labeled by the reference numeral 822.

The computer system 800 may further include a network interface device 808. A part or all of the data and code of the configuration module 822 may be transmitted or received over a network 820 via the network interface device 808. Although not shown in FIG. 8, the computer system 800 also may include user input/output devices (e.g., a keyboard, a touchscreen, speakers, and/or a display).

In one embodiment, the configuration module 822 can be implemented using code and data stored and executed on one or more computer systems (e.g., the computer system 800). Such computer systems store and transmit (internally and/or with other electronic devices over a network) code (composed of software instructions) and data using computer-readable media, such as non-transitory tangible computer-readable media (e.g., computer-readable storage media such as magnetic disks; optical disks; read only memory; flash memory devices as shown in FIGS. 8 as 804, 805 and 818) and transitory computer-readable transmission media (e.g., electrical, optical, acoustical or other form of propagated signals—such as carrier waves, infrared signals). A non-transitory computer-readable medium of a given computer system typically stores instructions for execution on one or more processors of that computer system.

The operations of the diagrams of FIGS. 2-7 have been described with reference to the exemplary embodiment of FIG. 8. However, it should be understood that the operations of the diagrams of FIGS. 2-7 can be performed by embodiments of the invention other than those discussed with reference to FIG. 8, and the embodiment discussed with reference to FIG. 8 can perform operations different from those discussed with reference to the diagrams of FIGS. 2-7. While the diagrams of FIGS. 2-7 show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method, implemented by a computer system adapted to generate an Availability Management Framework (AMF) configuration for a service provider system in which service units of a service group are allocated to node groups and the node groups are allocated to physical nodes such that hardware redundancy for the service group is guaranteed, wherein each service unit is a unit of redundancy for services provided and protected by the service group, and each service unit includes one or more hardware components, software components, or a combination of hardware and software components, the method comprising the steps of:

generating a node group set (NG set) of the node groups, wherein each node group includes a group of virtual machines and is mapped to a different host group of a set of host groups, wherein each host group includes one or more physical nodes, each of the one or more physical nodes belongs to a single host group from the set of host groups, wherein for each node group, the group of virtual machines belonging to that node group are hosted by the one or more physical nodes belonging to the host group mapped to that node group, and wherein a minimum number of physical nodes that are available to operate in the service provider system is determined based on a number of service units in a largest service group of a plurality of service groups in the AMF configuration;

generating collocation and separation rules for the virtual machines to specify which ones of the virtual machines are collocated in a same node group and which ones of the virtual machines are separated by different node groups; and mapping each service unit of one of the service groups of the plurality of service groups to a different node group in the NG set to thereby guarantee hardware separation in the AMF configuration for different service units of the service group and for the virtual machines allocated to the different service units.

2. The method of claim 1, further comprising:
generating migration rules that prohibit the virtual machines of different node groups to be migrated simultaneously and allow the virtual machines of a same node group to be migrated simultaneously.

3. The method of claim 1, wherein, prior to generating the node group, the method further comprises the step of identifying a maximum (Nmax) number and the minimum (Nmin) number of the physical nodes that are available to operate in the service provider system, and wherein a total number of the virtual machines is equal to Nmax and a total number of the node groups in the NG set is equal to Nmin.

4. The method of claim 1, wherein, prior to generating the node group, the method further comprises the steps of:
identifying a maximum number of the physical nodes that are available to operate in the service provider system; and
determining a total number of the node groups in the NG set to be equal to a total number of the service units in the service group for supporting a redundancy model used by the service group.

5. The method of claim 1, wherein generating the node group further comprises the step of distributing a total number of the virtual machines equally among the node groups in the NG set.

6. The method of claim 1, wherein the step of mapping further comprises allocating each service unit directly to one of the virtual machines in the node group to which that service unit is mapped.

7. The method of claim 1, further comprising the step of mapping one service unit from each of the plurality of service groups to a same node group in the NG set.

8. The method of claim 1, wherein the collocation and separation rules allow a virtual machine to migrate during operation from one physical node to another physical node in a same host group, and disallow the virtual machine to migrate during operation across different host groups.

9. The method of claim 1, wherein the AMF configuration does not expose a mapping between the virtual machines and the physical nodes to the service units.

10. A computer system adapted to generate an Availability Management Framework (AMF) configuration for a service provider system in which service units of a service group are allocated to node groups and the node groups are allocated to physical nodes such that hardware redundancy for the service group is guaranteed, wherein each service unit is a unit of redundancy for services provided and protected by the service group, and each service unit includes one or more hardware components, software components, or a combination of hardware and software components, the computer system comprising:

one or more processors;
one or more memory devices coupled to the one or more processors; and
a configuration generation module coupled to the one or more processors and the one or more memory devices, the configuration generation module adapted to:
generate a node group set (NG set) of the node groups, wherein each node group includes a group of virtual machines and is mapped to a different host group of a set of host groups, wherein each host group includes one or more physical nodes, each of the one or more physical nodes belongs to a single host group from the set of host groups, wherein for each node group, the group of virtual machines belonging to that node group are hosted by the one or more physical nodes belonging to the host group mapped to that node group, and wherein a minimum number of physical nodes that are available to operate in the service provider system is determined based on a number of service units in a largest service group of a plurality of service groups in the AMF configuration;
generate collocation and separation rules for the virtual machines to specify which ones of the virtual machines are collocated in a same node group and which ones of the virtual machines are separated by different node groups; and
map each service unit of one of the service groups of the plurality of service groups to a different node group in the NG set to thereby guarantee hardware separation in the AMF configuration for different service units of the service group and for the virtual machines allocated to the different service units.

11. The system of claim 10, wherein the configuration generation module is adapted to generate migration rules that prohibit the virtual machines of different node groups to be migrated simultaneously and allow the virtual machines of a same node group to be migrated simultaneously.

12. The system of claim 10, wherein the configuration generation module is adapted to identify a maximum (Nmax) number and the minimum (Nmin) number of the physical nodes that are available to operate in the service provider system, and wherein a total number of the virtual machines is equal to Nmax and a total number of the node groups in the NG set is equal to Nmin.

13. The system of claim 10, wherein the configuration generation module is adapted to identify a maximum number of the physical nodes that are available to operate in the service provider system, and to determine a total number of the node groups in the NG set to be equal to a total number of the service units in the service group for supporting a redundancy model used by the service group.

14. The system of claim 10, wherein the configuration generation module is adapted to distribute a total number of the virtual machines equally among the node groups in the NG set.

15. The system of claim 10, wherein the configuration generation module is adapted to allocate each service unit directly to one of the virtual machines in the node group to which that service unit is mapped.

16. The system of claim 10, wherein the configuration generation module is adapted to map one service unit from each of the plurality of service groups to a same node group in the NG set.

17. The system of claim 10, wherein the collocation and separation rules allows a virtual machine to migrate during operation from one physical node to another physical node in a same host group, and disallows the virtual machine to migrate during operation across different host groups.

18. The system of claim 10, wherein the AMF configuration does not expose a mapping between the virtual machines and the physical nodes to the service units.

19. A method, implemented by a computer system adapted to deploy an Availability Management Framework (AMF) configuration to a service provider system in which service units of a service group are allocated to node groups and the node groups are allocated to physical nodes such that hardware redundancy for the service group is guaranteed, wherein each service unit is a unit of redundancy for services provided and protected by the service group, and each service unit includes one or more hardware components, software components, or a combination of hardware and software components, the method comprising the steps of:

forming a node group set (NG set) of the node groups according to the AMF configuration, wherein each node group includes a group of virtual machines and is mapped to a different host group of a set of host groups, wherein each host group includes one or more physical nodes, each of the one or more physical nodes belongs to a single host group from the set of host groups, wherein for each node group, the group of virtual machines belonging to that node group are hosted by the one or more physical nodes belonging to the host group mapped to that node group, and wherein a minimum number of physical nodes that are available to operate in the service provider system is determined based on a number of service units in a largest service group of a plurality of service groups in the AMF configuration;

applying collocation and separation rules to the virtual machines, the collocation and separation rules specify which ones of the virtual machines are collocated in a same node group and which ones of the virtual machines are separated by different node groups; and mapping each service unit of one of the service groups of the plurality of service groups to a different node group in the NG set according to the AMF configuration to thereby guarantee hardware separation for different service units of the service group and for the virtual machines allocated to the different service units.

20. The method of claim 19, further comprising: applying migration rules that prohibit the virtual machines of different node groups to be migrated simultaneously and allow the virtual machines of a same node group to be migrated simultaneously.

21. The method of claim 19, wherein, prior to generating the node group, the method further comprises the step of identifying a maximum (Nmax) number and the minimum (Nmin) number of the physical nodes that are available to operate in the service provider system, and wherein a total number of the virtual machines is equal to Nmax and a total number of the node groups in the NG set is equal to Nmin.

22. A computer system adapted to deploy an Availability Management Framework (AMF) configuration in which service units of a service group are allocated to node groups and the node groups are allocated to physical nodes such that hardware redundancy for the service group is guaranteed, wherein each service unit is a unit of redundancy for services provided and protected by the service group, and each service unit includes one or more hardware components, software components, or a combination of hardware and software components, the computer system comprising:

one or more processors;

one or more memory devices coupled to the one or more processors; and a configuration deployment module coupled to the one or more processors and the one or more memory devices, the configuration deployment module adapted to:

form a node group set (NG set) of the node groups according to the AMF configuration, wherein each node group includes a group of virtual machines and is mapped to a different host group of a set of host groups, wherein each host group includes one or more physical nodes, each of the one or more physical nodes belongs to a single host group from the set of host groups, wherein for each node group, the group of virtual machines belonging to that node group are hosted by the one or more physical nodes belonging to the host group mapped to that node group, and wherein a minimum number of physical nodes that are available to operate in the service provider system is determined based on a number of service units in a largest service group of a plurality of service groups in the AMF configuration;

apply collocation and separation rules to the virtual machines, the collocation and separation rules specify which ones of the virtual machines are collocated in a same node group and which ones of the virtual machines are separated by different node groups; and map each service unit of one of the service groups of the plurality of service groups to a different node group in the NG set according to the AMF configuration to thereby guarantee hardware separation in the AMF configuration for different service units of the service group and for the virtual machines allocated to the different service units.

23. The system of claim 22, wherein the configuration deployment module is adapted to apply migration rules that prohibit the virtual machines of different node groups to be migrated simultaneously and allow the virtual machines of a same node group to be migrated simultaneously.

24. The system of claim 22, wherein the configuration deployment module is adapted to identify a maximum (Nmax) number and the minimum (Nmin) number of the physical nodes that are available to operate in the service provider system, and wherein a total number of the virtual machines is equal to Nmax and a total number of the node groups in the NG set is equal to Nmin.

* * * * *